United States Patent
Kwak et al.

(10) Patent No.: US 8,423,183 B2
(45) Date of Patent: Apr. 16, 2013

(54) ROBOT AND METHOD OF CONTROLLING THE SAME

(75) Inventors: Ho Seong Kwak, Seoul (KR); Woong Kwon, Seongnam-si (KR); Kyung Shik Roh, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 660 days.

(21) Appl. No.: 12/591,122

(22) Filed: Nov. 9, 2009

(65) Prior Publication Data
US 2010/0161118 A1 Jun. 24, 2010

(30) Foreign Application Priority Data
Dec. 23, 2008 (KR) .......................... 10-2008-132109

(51) Int. Cl.
*G06F 19/00* (2011.01)
*G05B 19/00* (2006.01)
*B25J 9/18* (2006.01)
*B25J 5/00* (2006.01)
*B62D 51/06* (2006.01)

(52) U.S. Cl.
USPC ...... 700/245; 700/260; 700/261; 318/568.11; 318/568.12; 318/568.2; 180/8.1; 180/8.2; 180/8.6; 901/1; 901/9; 901/46

(58) Field of Classification Search .................. 700/245, 700/260, 261; 318/568.11, 568.12, 568.2; 180/8.1, 8.2, 8.6; 901/1, 9, 46
See application file for complete search history.

(56) References Cited

U.S. PATENT DOCUMENTS

| | | | | |
|---|---|---|---|---|
| 5,594,644 | A * | 1/1997 | Hasegawa et al. | 701/23 |
| 2007/0145930 | A1* | 6/2007 | Zaier | 318/568.12 |
| 2008/0185985 | A1* | 8/2008 | Miyazaki | 318/568.12 |
| 2008/0275831 | A1* | 11/2008 | Reil | 706/23 |
| 2009/0030344 | A1* | 1/2009 | Moser et al. | 600/587 |
| 2010/0113980 | A1* | 5/2010 | Herr et al. | 600/587 |
| 2010/0114329 | A1* | 5/2010 | Casler et al. | 623/24 |
| 2010/0174385 | A1* | 7/2010 | Casler et al. | 623/50 |
| 2010/0179668 | A1* | 7/2010 | Herr et al. | 623/51 |

\* cited by examiner

*Primary Examiner* — James Trammell
*Assistant Examiner* — Majdi Alsomiri
(74) *Attorney, Agent, or Firm* — Staas & Halsey LLP

(57) ABSTRACT

Disclosed is a method of generating a hip trajectory of a biped walking robot to allow the robot to stably walk on a two-dimensional space without falling down. An angular velocity of a hip of a swinging leg is obtained by measuring the angle/angular velocity of an ankle pitch joint part of a supporting leg in real time when the robot walks on the two-dimensional space, and desired trajectories of the ankle and the hip are generated based on the angular velocity of the ankle of the supporting leg and the angular velocity of the hip of the swinging leg.

14 Claims, 10 Drawing Sheets

ROBOT AND METHOD OF CONTROLLING THE SAME

CROSS-REFERENCE TO RELATED APPLICATIONS

This application claims the benefit of Korean Patent Application No. 2008-0132109, filed Dec. 23, 2008, in the Korean Intellectual Property Office, the disclosure of which is incorporated herein by reference.

BACKGROUND

1. Field

The present invention relates to a robot and a method of controlling the same, and more particularly, to a method of generating a hip trajectory of a biped walking robot to allow the robot to stably walk on a two-dimensional space without falling down.

2. Description of the Related Art

In general, machines, which conduct motions similar to those of a human being using an electrical or magnetic action, are known as robots. Early robots were industrial robots, such as manipulators or transfer robots, for work automation and unmanned operation in a production field. These robots performed dangerous work, simple repetitive work, or work requiring large forces in place of a human being. Recently, biped walking robots have been vigorously researched and developed. The biped robots have a joint system similar to that of a human being, live together with the human being in human working and living spaces, and walk with two feet, have been vigorously researched and developed.

Methods of controlling the walking of a biped robot include a position-based zero moment point (ZMP) control method, and a torque-based finite state machine (FSM) control method. In the ZMP control method, values desired by a user on a rectangular coordinate system are generated in advance based on the center of gravity of the biped robot and ends (hereinafter, referred to as end effectors) of both feet of the robot, and desired trajectories of all joints of the robot are made using kinematics characteristics between links and the joints of the robot. Such a ZMP control method maps the desired rectangular coordinate trajectories of the end effectors in consideration of a weight-based ZMP trajectory with angles/angular velocities/accelerations of the joints, and thus requires a large amount of calculation in real time and has a complicated calculating process. Further, results of a calculation expression regarding all joints are obtained in a path, in which the robot will move, and plural solutions are calculated. Thus, a solution desired by a user should be obtained by simulation or checked again. On the other hand, in the FSM control method, finite states of the biped robot are defined in advance, and then the finite states of the biped robot are sequentially changed while walking, thus allowing the biped robot to properly walk. Thus, the FSM control method is capable of obtaining a stable walking pattern without using a complicated calculating process, when relationships between desired angles of joints are generated. Accordingly, the relationships between the desired angles of the respective joints should be set such that the biped robot can stably walk without falling down.

SUMMARY

Therefore, one aspect of the invention is to provide a method of generating a hip trajectory of a FSM-based biped robot by measuring angles/angular velocities of ankle joints of the robot in real time such that the biped robot can stably walk on a two-dimensional space without falling down.

Additional aspects and/or advantages will be set forth in part in the description which follows and, in part, will be apparent from the description, or may be learned by practice of the invention.

The foregoing and/or other aspects of the present invention are achieved by providing a method of controlling a robot including measuring an angle of an ankle of a first leg of the robot, which supports the robot when the robot walks; obtaining an angular velocity of a hip of a second leg of the robot, which swings, by calculating an angular velocity of the ankle of the first leg from the angle of the ankle of the first leg; and generating desired trajectories of the ankle and the hip based on the angular velocity of the ankle of the first leg and the angular velocity of the hip of the second leg.

The robot may be a finite state machine (FSM)-based biped walking robot.

The measurement of the angle of the ankle of the first leg may be achieved by measuring an angle of an ankle pitch joint part of the first leg varied according to states of the FSM.

The calculation of the angular velocity of the ankle of the first leg may be achieved by calculating an angular velocity of the ankle pitch joint part of the first leg.

The obtaining of the angular velocity of the hip of the second leg may be achieved by obtaining an angular velocity of a hip pitch joint part of the second leg.

The angular velocity of the hip pitch joint part of the second leg may be obtained by the below expression: angular velocity of hip pitch joint part of second leg=K×Angular velocity of ankle pitch joint part of first leg, where, K is a constant set according to walking patterns of the robot.

The method may further include obtaining an included angle between the first and second legs, and the generation of the desired trajectory of the ankle may be achieved by rotating the ankle pitch joint part of the first leg by the included angle.

The generation of the desired trajectory of the hip may be achieved by rotating the hip pitch joint part of the second leg by K times the included angle.

The generation of the desired trajectory of the hip may be achieved by setting the rotating speed of the hip of the second leg to K times the rotating speed of the ankle of the first leg such that the center of gravity of the robot can be located at the center of the included angle.

The included angle between the first and second legs may be the maximum value of the desired trajectory of the ankle to maintain the center of gravity of the robot.

The method may further include generating a desired trajectory of a knee of the second leg from the desired trajectory of the ankle.

The foregoing and/or other aspects of the present invention may be achieved by providing a robot including a measuring unit to measure an angle of an ankle of a first leg, which supports the robot when the robot walks; and a control unit to obtain an angular velocity of a hip of a second leg, which swings, by calculating an angular velocity of the ankle of the first leg from the angle the ankle of the first leg, and generate desired trajectories of the ankle and the hip based on the angular velocity of the ankle of the first leg and the angular velocity of the hip of the second leg.

The robot may further include an input unit to input walking instructions, such as a walking speed and a step width of the robot, and the control unit may rotate the first leg on a support point based on the angle of the ankle of the first leg measured by the measuring unit in real time according to the walking instructions of the robot.

The control unit may rotate the second leg on a hip pitch joint part based on the angular velocity of the hip of the second leg calculated from the angular velocity of the ankle of the first leg.

The control unit may set the rotating speed of the hip of the second leg to a designated multiple of the rotating speed of the ankle of the first leg to maintain the center of gravity of the robot.

BRIEF DESCRIPTION OF THE DRAWINGS

These and/or other aspects and advantages of the invention will become apparent and more readily appreciated from the following description of the embodiments, taken in conjunction with the accompanying drawings in which.

DETAILED DESCRIPTION OF EMBODIMENTS

Figure 1:
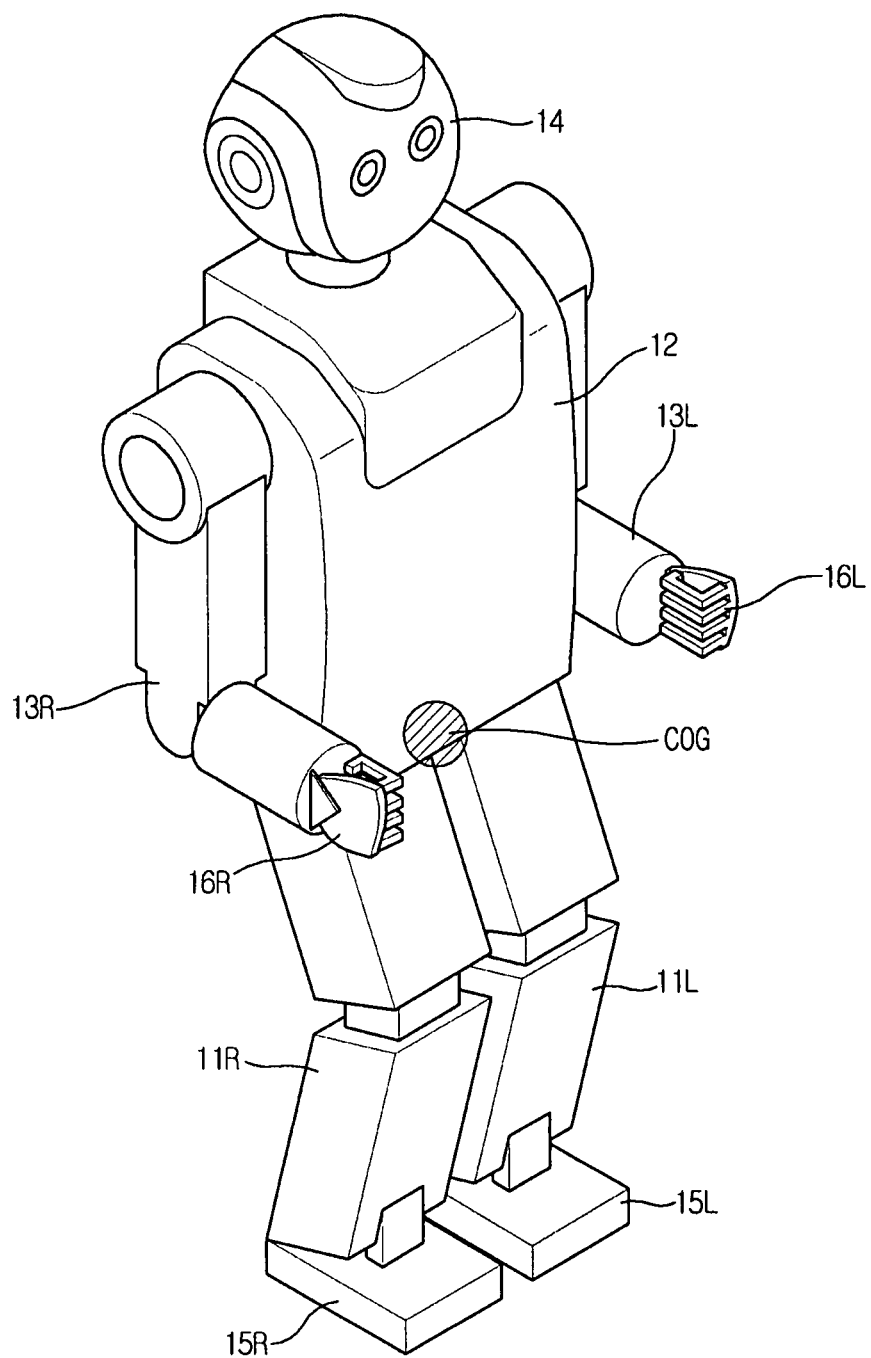
FIG. 1 is a schematic view illustrating the external appearance of a robot in accordance with an embodiment of the present invention.

Reference will now be made in detail to the embodiment of the present invention, an example of which is illustrated in the accompanying drawings, wherein like reference numerals refer to like elements throughout. The embodiment is described below to explain the present invention by referring to the annexed drawings.

FIG. 1 is a schematic view illustrating the external appearance of a robot in accordance with an embodiment of the present invention.

In FIG. 1, a robot 10 in accordance with this embodiment is a biped walking robot, which walks upright with two legs 11R and 11L in the same way as a human being, and includes a torso 12, two arms 13R and 13L and a head 14 provided at the upper portion of the torso 12, and feet 15R and 15L and hands 16R and 16L respectively provided at tips of the two legs 11R and 11L and the two arms 13R and 13L.

Here, R represents the right side of the robot 10, L represents the left side of the robot 10, and COG represents the center of gravity of the robot 10.

Figure 2:
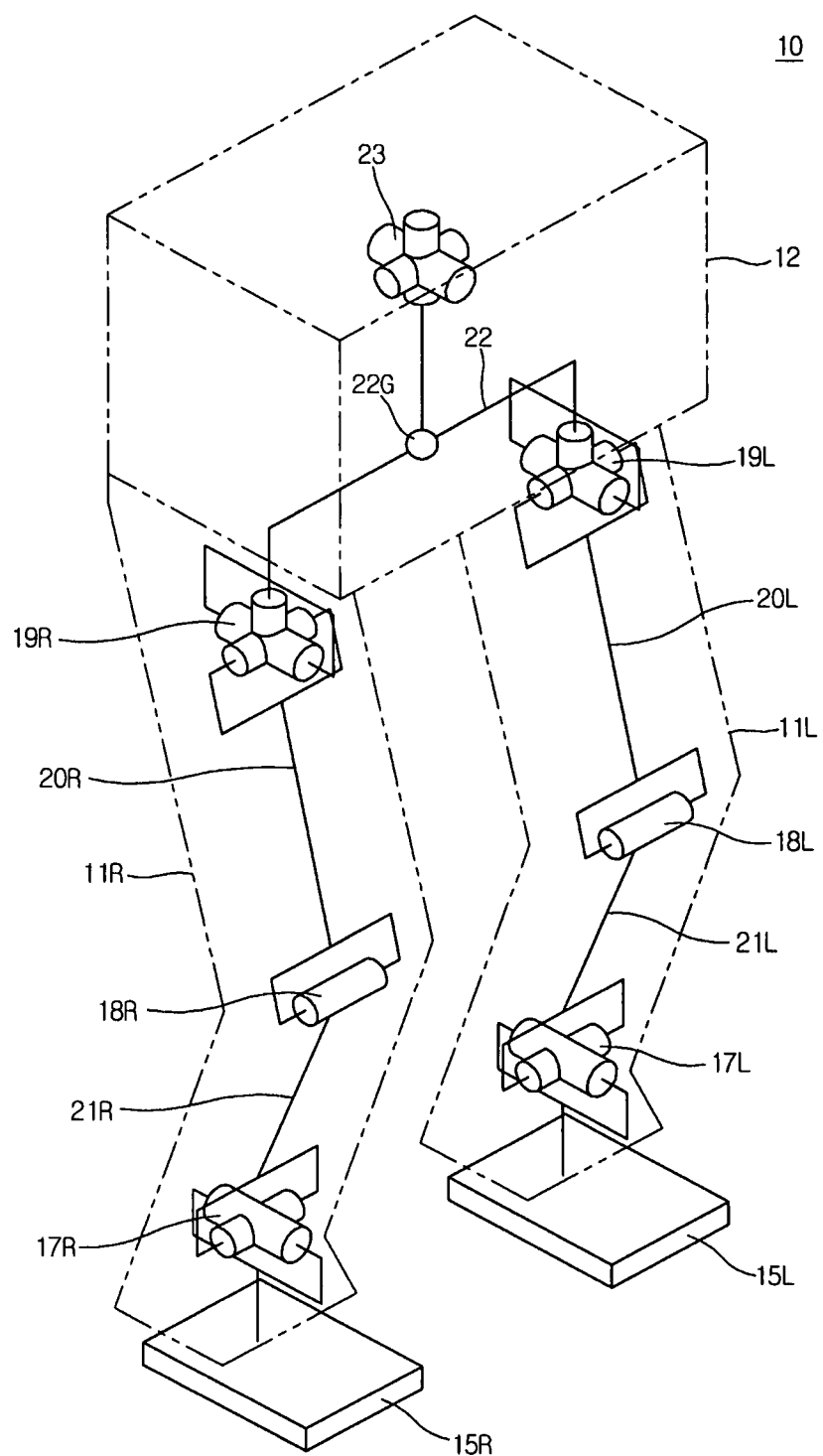
FIG. 2 is a view illustrating structures of main joints of the robot of FIG. 1.

FIG. 2 is a view illustrating structures of main joints of the robot of FIG. 1.

In FIG. 2, the two legs 11R and 11L respectively include ankle joints 17R and 17L, knee joints 18R and 18L, and hip joints 19R and 19L such that parts of the robot 10 corresponding to ankles, knees, and hips are rotatable, and the hip joints 19R and 19L are located at both sides of the lower portion of the torso 12 connected with the two legs 11R and 11L.

The ankle joints 17R and 17L of the respective legs 11R and 11L are movable in the directions of the X-axis (roll axis) and the Y-axis (pitch axis), the knee joints 18R and 18L of the respective legs 11R and 11L are movable in the direction of the Y-axis (pitch axis), and the hip joints 19R and 19L of the respective legs 11R and 11L are movable in the directions of the X-axis (roll axis), the Y-axis (pitch axis), and the Z-axis (yaw axis).

Further, the two legs 11R and 11L respectively include thigh links 20R and 20L connecting the hip joints 19R and 19L and the knee joints 18R and 18L, and calf links 21R and 21L connecting the knee joints 18R and 18L and the ankle joints 17R and 17L, and thus have a designated degree of freedom according to the movements of the respective joints 17R, 17L, 18R, 18L, 19R, and 19L.

The torso 12 connected with the two legs 11R and 11L includes a waist joint 23 such that a part of the robot 10 corresponding to a waist is rotatable, and the waist joint 23 is located coaxially with the center 22G of a hip link 22 connecting the hip joints 19R and 19L located at both sides of the lower portion of the torso 12, i.e., the center of gravity COG of the robot 10, and thus is movable in the directions of the X-axis (roll axis), the Y-axis (pitch axis), and the Z-axis (yaw axis).

Each of the joints 17R, 17L, 18R, 18L, 19R, 19L, and 23 of the robot 10 includes an actuator (not shown, for example, a driving device, such as a motor) to drive the corresponding joint.

Figure 3:
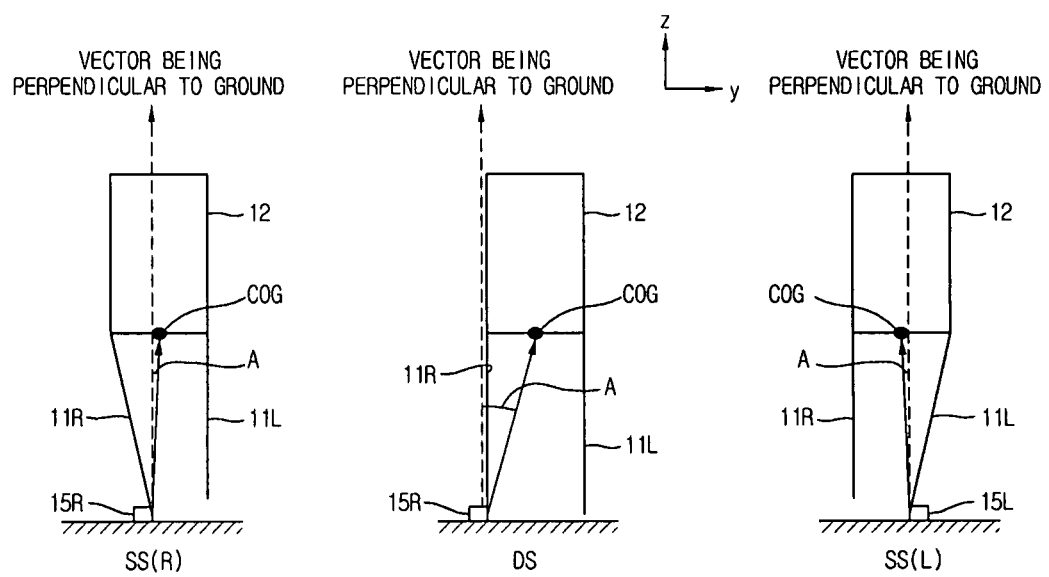
FIG. 3 is a view illustrating limit cycle control angles of an FSM-based robot in accordance with the embodiment of the present invention, defined on a two-dimensional space.

FIG. 3 is a view illustrating limit cycle control angles of the FSM-based robot in accordance with the embodiment of the present invention, defined on a two-dimensional space, i.e., respectively illustrating the torso 12 and the right and left legs 11R and 11L of the robot 10 on a Y-Z plane (two-dimensional space) formed by the Y-axis (pitch axis) and the Z-axis (yaw axis), modeled on the figure of a human, in which both feet alternately swing, when the human walks forward.

In FIG. 3, there are three states of the FSM-based robot 10, i.e., a double support (hereinafter, is referred to as 'DS') state, in which the robot 10 is supported with its both feet, a single support right (hereinafter, is referred to as 'SS(R)') state, in which the robot 10 is supported only with its right foot, and a single support left (hereinafter, is referred to as 'SS(L)') state, in which the robot 10 is supported only with its left foot, and a finite state machine (FSM) is characterized in that the states are regularly repeated.

A represents a control angle, at which the robot 10 can balance itself on a two-dimensional space using the limit cycle, and is defined as an angle between a vector, which is perpendicular to the ground, and a vector, which comes up to the center of gravity of the robot 10, from a contact point of the robot 10 with the ground (i.e., the sole of the foot of the supporting leg). The control angle A arises from the contact point of the robot 10 with the ground, and thus controls the ankle joints 17R and 17L of the robot 10.

FIG. 3 illustrates the control angles A, at which the robot 10 can balance itself on the two-dimensional space using the limit cycle. On a space, where the robot 10 actually walks, trajectories of different joints 17R, 17L, 19R, and 19L (particularly, the hip joints) according to the trajectory of the limit cycle control angles A must be generated. The reason is that the limit cycle control angles A only allow the robot 10 in the DS state or the SS(R) or SS(L) state, i.e., in a standstill state, to balance itself right and left but cannot allow the robot 10 to stably walk without falling down, and thus in order to generate a stable walking pattern, trajectories of the ankle joints 17R and 17L and the hip joints 19R and 19L must be generated.

In order to allow the FSM-based robot 10 to kinematically walk without falling down, trajectories are respectively provided to the respective joint parts of the right and left legs 11R and 11L. Each of the ankle joints 17R and 17L has a roll joint part and a pitch joint part, each of the knee joints 18R and 18L has a pitch joint part, and each of the hip joints 19R and 19L has a roll joint part, a pitch joint part, and a yaw joint part. That is, one leg 11R or 11L of the robot 10 has six joint parts. The FSM-based robot 10 relates to forward walking on the two-dimensional space, and thus only the pitch parts of the respective joints are considered. When one step of the robot 10 is achieved by landing one foot 15R or 15L on the ground and then landing the other foot 15L or 15R on the ground, the rear leg of the robot 10 moves forward and then is landed on the ground. Here, joint parts relating the walking of the robot 10 are the angle pitch joint parts and the hip pitch joint parts.

Thus, in order to achieve the stable walking of the FSM-based robot 10, a relations hips between the ankle pitch joint parts and the hip pitch joint parts must be obtained to generate a stable walking pattern of the FSM-based robot 10.

Figure 4:
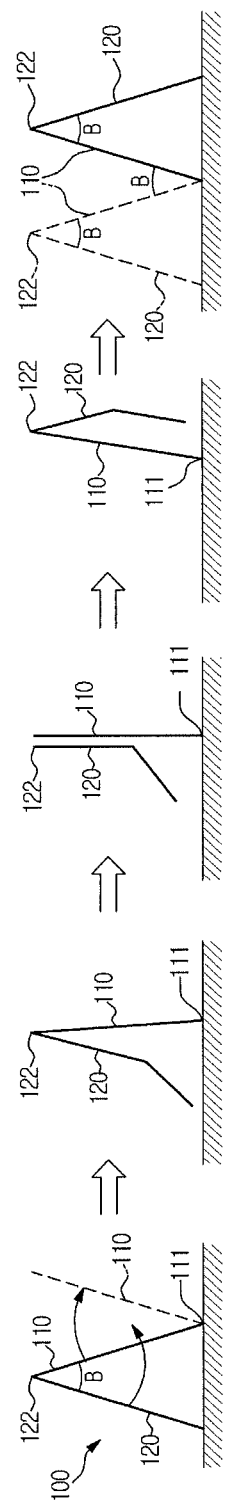
FIG. 4 is a view illustrating a compass model exemplifying a process of generating trajectories of hip and ankle pitch joint parts of the FSM-based robot in accordance with the embodiment of the present invention.

FIG. 4 is a view illustrating a compass model exemplifying a process of generating trajectories of hip and ankle pitch joint parts of the FSM-based robot in accordance with the embodiment of the present invention.

In FIG. 4, a compass model 100 includes a front leg 110 and a rear leg 120 according to walking directions, and an included angle B of a designated degree to maintain the center of gravity of the robot 10 is formed between the two legs 110 and 120.

In the compass model 100, when an ankle pitch joint part 111 of the front leg 110, which is a supporting leg, is rotated on the center of gravity COG of the FSM-based robot 10 and a hip pitch joint part 122 of the rear leg 120, which is a swinging leg, is rotated by twice the included angle B between the two legs 110 and 120 simultaneously, the center of gravity COG of the FSM-based robot 10 is located at the center of the two legs 110 and 120 at any time. That is, when the ankle pitch joint part 111 of the front leg 110 is rotated by the included angle B between the two legs 110 and 120 and the hip pitch joint part 122 of the rear leg 120 is rotated by twice the included angle B between the two legs 110 and 120 simultaneously for a time to form one step, the FSM-based robot 10 walks. Therefore, in order to generate desired trajectories of the pitch joint parts 111 and 122, when the hip rotating speed of the rear leg 120 is set to twice the ankle rotating speed of the front leg 110, the center of gravity of the FSM-based robot 10 is located at the center of the included angle B between the two legs 110 and 120 at any time, and thus does not swing in the walking direction or does not move irregularly. Thereby, the center of gravity COG of the FSM-based robot 10 is uniform according to time, and thus the FSM-based robot 10 does not fall down at any time.

The above process of generating the trajectories of the ankle and hip pitch joint parts 111 and 122 of the compass model 100, which is divided into the generation of the trajectory of the ankle pitch joint part 111 of the front leg 110 and the generation of the trajectory of the hip pitch joint part 122 of the rear leg 120, will be described with reference to FIGS. 5 to 7.

Figure 5:
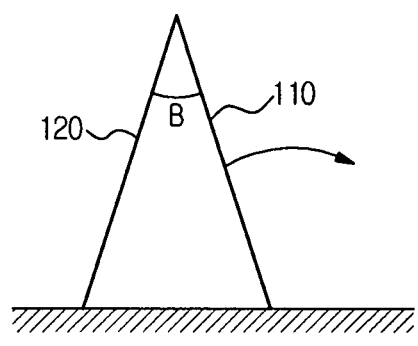
FIG. 5 is a view illustrating a process of rotating a supporting leg on a support point in the compass model of FIG. 4.
Figure 5:
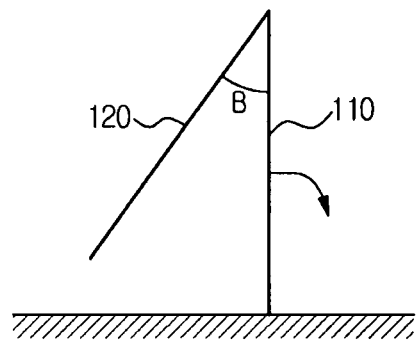
Figure 5:
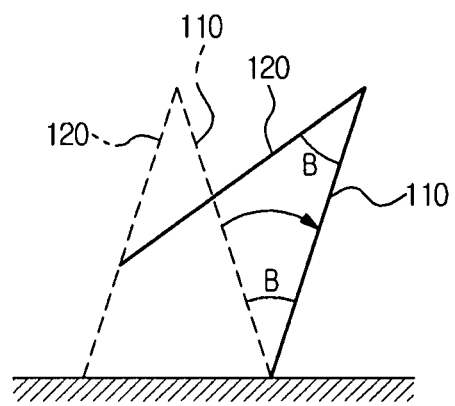

FIG. 5 is a view illustrating a process of rotating the supporting leg on a support point in the compass model of FIG. 4, on the assumption that a hip angle of the swinging leg 120 is fixed.

In FIG. 5, the trajectory of the ankle pitch joint part 111 of the front leg 110, which is the supporting leg, is generated by rotating the ankle pitch joint part 111 (i.e., the support point) of the front leg 110 by the included angle B between the two legs 110 and 120 at an ankle torque under the condition that the front leg 110 is supports the compass model 100 and the rear leg 120 swings.

Figure 6:
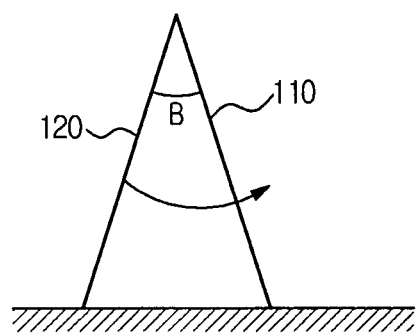
FIG. 6 is a view illustrating a process of rotating a swinging leg on a hip pitch joint part in the compass model of FIG. 4.
Figure 6:
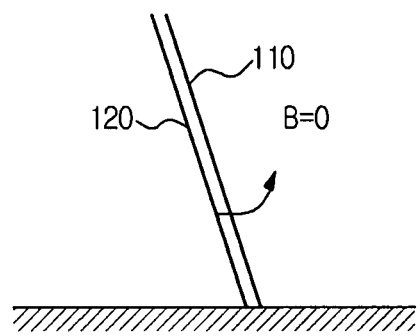
Figure 6:
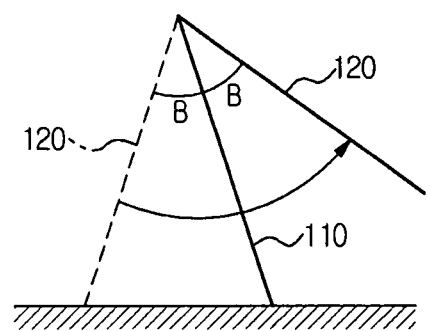

FIG. 6 is a view illustrating a process of rotating the swinging leg on a hip pitch joint part in the compass model of FIG. 4, on the assumption that an ankle angle of the supporting leg 110 is fixed.

In FIG. 6, the trajectory of the hip pitch joint part 122 of the rear leg 120, which is the swinging leg, is generated by rotating the hip pitch joint part 122 of the rear leg 120 by twice the included angle B between the two legs 110 and 120 at a hip torque when the front leg 110 supports the compass model 100 and the rear leg 120 swings.

Figure 7:
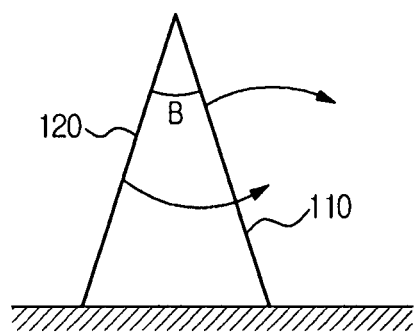
FIG. 7 is a view illustrating a process of forming one step on the basis of the support point of the supporting leg and the hip pitch joint part of the swinging leg in the compass model of FIG. 4.
Figure 7:
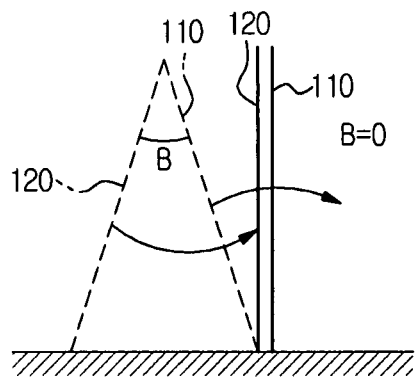
Figure 7:
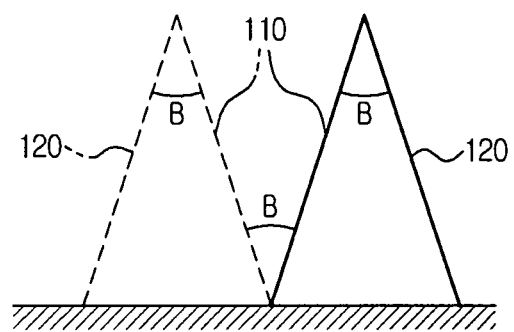

FIG. 7 is a view illustrating a process of forming one step on the basis of the support point of the supporting leg and the hip pitch joint part of the swinging leg in the compass model of FIG. 4. Here, the process of FIG. 5 and the process of FIG. 6 are simultaneously carried out.

In FIG. 7, the trajectory of the ankle pitch joint part 111 of the front leg 110, which is the supporting leg, and the trajectory of the hip pitch joint part 122 of the rear leg 120, which is the swinging leg, are generated by simultaneously rotating the ankle pitch joint part 111 (i.e., the support point) of the front leg 110 by the included angle B between the two legs 110 and 120 at an ankle torque and rotating the hip pitch joint part 122 of the rear leg 120 by twice the included angle B between the two legs 110 and 120 at a hip torque when the front leg 110 supports the compass model 100 and the rear leg 120 swings.

Figure 8:
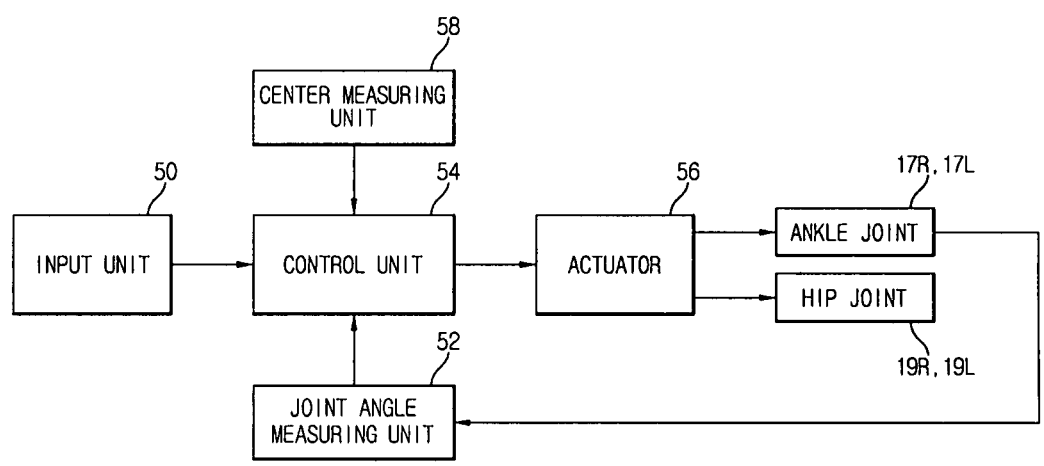
FIG. 8 is a control block diagram to generate a walking pattern of the FSM-based robot in accordance with the embodiment of the present invention.

FIG. 8 is a control block diagram to generate a walking pattern of the FSM-based robot in accordance with the embodiment of the present invention. The FSM-based robot includes an input unit 50, a joint angle measuring unit 52, a control unit 54, actuators 56, and a center measuring unit 58.

The input unit 50 inputs walking instructions, such as a walking speed, a step width, etc., and sets a limit cycle control angle A to control the ankle joint 17R or 17L simultaneously such that the FSM-based robot 10 can stably walk on a two-dimensional space.

The joint angle measuring unit 52 measures the angle of the ankle joint 17R or 17L (particularly, the ankle pitch angle of the supporting leg) moving according to the driving of the actuator 56, and transmits the measured angle to the control unit 54. The joint angle measuring unit 56 is a control factor to generate trajectories of the pitch joint parts of the ankle joint 17R or 17L and the hip joint 19R or 19L to form the stable walking pattern of the FSM-based robot 10.

The control unit 54 is a PD controller, which controls the overall operation of the FSM-based robot 10, and when the walking instructions, such as a walking speed, a step width, etc., to be desired by the FSM-based robot 10 are given, generates a walking pattern according to the given walking instructions. In order to generate the stable walking pattern in the generation of the walking pattern of the FSM-based robot 10, an ankle pitch angular velocity of the supporting leg 11R or 11L is obtained from the ankle pitch angle of the supporting leg 11R or 11L measured by the joint angle measuring unit 52 in real time, a hip pitch angular velocity of the swinging leg 11L or 11R is calculated from the obtained ankle pitch angular velocity, and a hip pitch angle of the swinging leg 11L or 11R is obtained from the calculated hip pitch angular velocity of the swinging leg 11L or 11R. Thereby, the desired trajectories of the ankle joint 17R or 17L and the hip joint 19R or 19L to achieve the stable walking of the robot 10 are generated.

Further, the control unit 54 generates an ankle torque to rotate the supporting leg 11R or 11L on the ankle pitch joint part, i.e., the support point, and a hip torque to rotate the swinging leg 11L or 11R on the hip pitch joint part, whenever the FSM-based robot 10 forms one step, and respectively provides the generated angle torque and the generated hip torque to the ankle joint 17R or 17L and the hip joint 19R or 19L.

Each of the actuators 56 drives the ankle joint 17R or 17L and the hip joint 19R or 19L according to a torque control signal of the control unit 54 such that the FSM-based robot 10 can stably walk according to the desired trajectories of the ankle joint 17R or 17L and the hip joint 19R of 19L corresponding to the state of the robot 10.

The center measuring unit 58 measures the position of the center of gravity COG of the robot 10, which is varied according to the states of the robot 10, and transmits the measured position of the center of gravity COG of the robot 10 to the control unit 54. The center measuring unit 58 is a control factor, which feeds the position of the center of gravity COG of the robot 10 back to the control unit 54 to generate the stable walking pattern of the robot 10 according to the position of the center of gravity of the robot 10.

Figure 9:
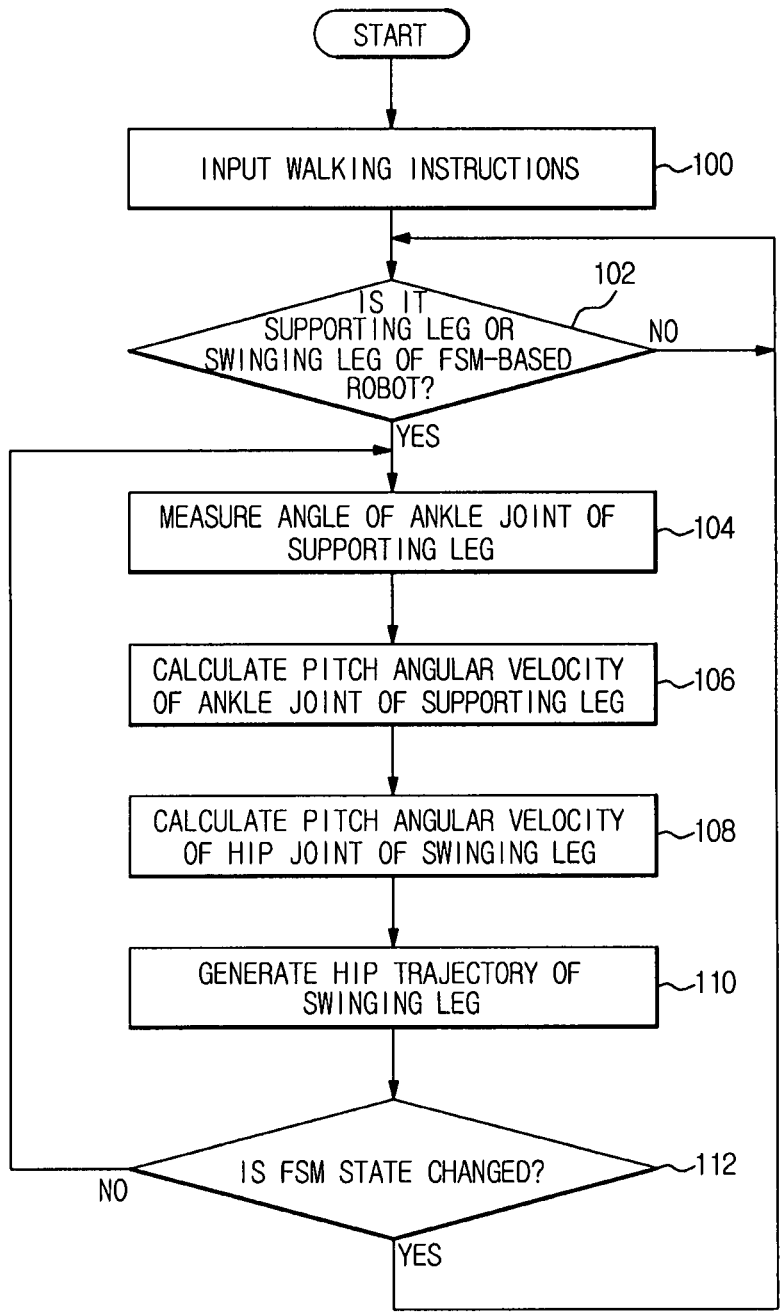
FIG. 9 is a flow chart illustrating a method of generating a trajectory of the hip of the FSM-based robot in accordance with the embodiment of the present invention to achieve the stable walking of the robot.

FIG. 9 is a flow chart illustrating a method of generating a hip trajectory of the FSM-based robot in accordance with the embodiment of the present invention to achieve the stable walking of the robot.

As shown in FIG. 9, when walking instructions, such as a walking speed, a step width, etc., are inputted through the input unit 50 (operation 100), the control unit 54 determines desired positions and directions of both feet 15R and 15L and sets desired trajectories of the ankles according to time based on the determined desired positions and directions, and then the FSM-based robot 10 starts to walk according to the set trajectories.

When the FSM-based robot 10 starts to walk, the swinging leg 11L or 11R moves forward and then is landed on the ground and the supporting leg 11R or 11L supports the FSM-based robot 10 to prevent the robot 10 from falling down during one step achieved by landing one foot 15R or 15L on the ground and then landing the other foot 15L or 15R on the ground (operation 102).

When the one step of the above FSM-based robot 10 is formed, the joint angle measuring unit 56 measures the angle of the ankle joint 17R or 17L (particularly, the pitch angle of the ankle joint of the supporting leg) moving according to the driving of the actuator 56, and transmits the measured angle to the control unit 54 (operation 104). Then, the control unit 54 calculates a pitch angular velocity of the ankle joint 17R or 17L the supporting leg 11R or 11L from the angle of the ankle joint 17R or 17L of the supporting leg 11R or 11L measured by the joint angle measuring unit 52 in real time to generate the stable walking pattern of the FSM-based robot 10 (operation 106).

Thereafter, the control unit 54 calculates a pitch angular velocity of the pitch joint 19L or 19R of the swinging leg 11L or 11R from the calculated pitch angular velocity of the ankle joint 17R or 17L the supporting leg 11R or 11L using the below expression 1 (operation 108).

Pitch angular velocity of hip joint of swinging leg=2× Pitch angular velocity of ankle joint of supporting leg [Expression 1]

When the pitch angular velocity of the hip joint 19L or 19R of the swinging leg 11L or 11R is calculated through the above expression 1, a pitch angle of the hip joint 19L or 19R of the swinging leg 11L or 11R can be obtained, and thus a hip trajectory is generated (operation 110).

When the FSM-based robot 10 forms one step through the generated hip trajectory, the FSM-based robot 10 does not fall forward, and stably walks by repeating this process after the one step has been completed (operation 112). That is, only when the desired trajectory of the ankle is set, the trajectory of the ankle pitch joint part and the trajectory of the hip pitch joint part, which are necessary to achieve the stable walking of the FSM-based robot, are simultaneously obtained.

Although a reference desired trajectory of the ankle satisfying the expression 1 is set using a function desired by a user or is directly designed in a nonlinear curve, a hip trajectory to allow the FSM-based robot 10 to stably walk is designed, and the set of the reference trajectory of the ankle satisfying the expression 1 is not completed.

The FSM-based robot 10 has the disadvantage of difficulty in exactly walking with a fixed step width. Since the trajectories of the respective joints are combined, it is difficult to predict the step width. However, when the method in accordance with this embodiment is used, the step width is defined as the included angle B between the two legs 11R and 11L, and thus a size of the step width is obtained using the below expression 2.

Size of step width=2×L×sin(B/2) [Expression 2]

Here, L represents a length of the right and left legs of the FSM-based robot 10, and B represents an included angle between the two legs.

Therefore, it is easy to design the step width through the above expression 2, and since the included angle B is the maximum value of the desired trajectory of the ankle, the step width may be an input and thus the step width may be used as an input variable. That is, when the step width is designed to a desired value, the included angle B between the two legs 11R and 11L can be obtained, and when an ankle pitch trajectory is designed, the FSM-based robot 10 can stably walk with a step width desired by a user using the expression 1.

Further, the FSM-based robot 10 does not walk through the combination of several trajectories, but when an ankle pitch angle is designed and measured in real time, a hip trajectory is automatically generated through the above expression, and thus a calculating process is simple and an amount of calculation is small.

Figure 10:
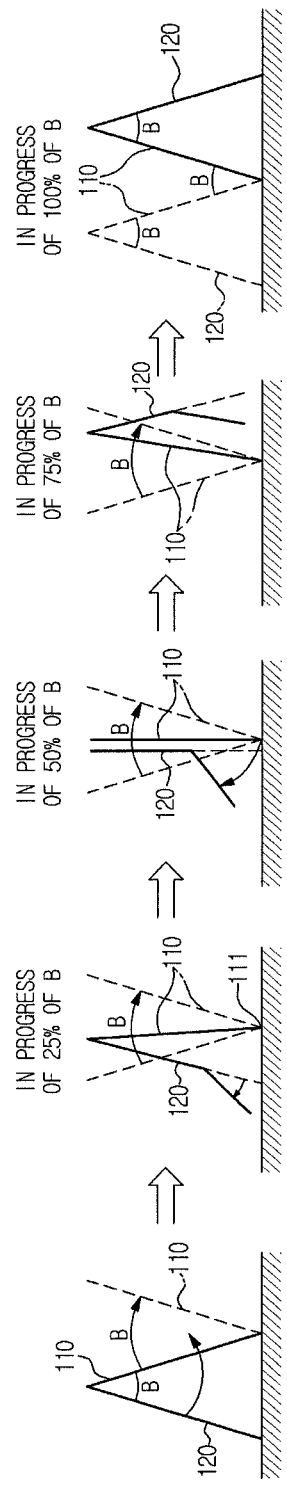
FIG. 10 is a view illustrating another process of forming one step on the basis of the support point of the supporting leg and the hip pitch joint part of the swinging leg in the compass model of FIG. 4.

FIG. 10 is a view illustrating a compass model exemplifying a process of generating pitch joint part trajectories of hips and ankles of the FSM-based robot in accordance with the embodiment of the present invention.

In FIG. 10, a compass model 100 includes a front leg 110 and a rear leg 120 according to walking directions, and an included angle B of a designated degree to maintain the center of gravity of the robot 10 is formed between the two legs 110 and 120.

In the compass model 100, when an ankle pitch joint part 111 of the front leg 110, which is the supporting leg, is rotated on the center of gravity COG of the FSM-based robot 10 and a hip pitch joint part 122 of the rear leg 120, which is the swinging leg, is rotated by twice the included angle B between the two legs 110 and 120 simultaneously, the center of gravity COG of the FSM-based robot 10 is located at the center of the two legs 110 and 120 at any time. On this account, when a desired trajectory of the ankle is designed, the knee is freely bent and stretched within the desired trajectory. Here, the included angle B is the maximum angle between the front leg 110 and the rear leg 120, and the walking position of the front leg 110 to form one step is the ankle trajectory designed by a user. By generating the bending and stretching trajectory of the knee of the rear leg 120 within the trajectory of the ankle of the front leg 110 designed by the user, the FSM-based robot 10 can stable walk without falling down at any time.

In accordance with one embodiment of the present invention, a hip trajectory of a FSM-based biped robot is generated by measuring the angle/angular velocity of an ankle joint of the robot in real time such that the biped robot can stably walk on a two-dimensional space without falling down, thereby allowing the biped robot to stably walk without falling down.

Although an embodiment of the invention has been shown and described, it would be appreciated by those skilled in the art that changes may be made in this embodiment without departing from the principles and spirit of the invention, the scope of which is defined in the claims and their equivalents.

What is claimed is:

1. A method of controlling a finite state machine (FSM)-based biped walking robot, the method comprising:
    measuring an angle of an ankle pitch joint part of a first leg of the robot in real time, the first leg supporting the robot when the robot walks;
    calculating an angular velocity of the ankle pitch joint part of the first leg from the measured angle of the ankle of the first leg;
    calculating an angular velocity of a hip pitch joint part of a second leg of the robot from the calculated angular velocity of the ankle pitch joint part of the first leg, the second leg swinging when the robot walks; and
    generating desired trajectories of the ankle and the hip based on the angular velocity of the ankle pitch joint part of the first leg and the angular velocity of the hip pitch joint part of the second leg.

2. The method according to claim 1, wherein the obtaining the angular velocity of the hip pitch joint part of the second leg comprises using, angular velocity of hip pitch joint part of second leg=K times angular velocity of ankle pitch joint part of first leg, wherein K is a constant set according to walking patterns of the robot.

3. The method according to claim 1, further comprising obtaining an included angle between the first and second legs to maintain a center of gravity of the robot, wherein the generating of the desired trajectory of the ankle comprises rotating the ankle pitch joint part of the first leg by the included angle.

4. The method according to claim 3, wherein the generating of the desired trajectory of the hip comprises rotating the hip pitch joint part of the second leg by K times the included angle.

5. The method according to claim 3, wherein the generating of the desired trajectory of the hip comprises setting the rotating speed of the hip of the second leg to K times the rotating speed of the ankle of the first leg such that the center of gravity of the robot can be located at the center of the included angle.

6. The method according to claim 3, wherein the included angle between the first and second legs is the maximum value of the desired trajectory of the ankle to maintain the center of gravity of the robot.

7. The method according to claim 3, further comprising generating a desired trajectory of a knee of the second leg from the desired trajectory of the ankle.

8. A finite state machine (FSM)-based biped walking robot comprising:
    a measuring unit to measure an angle of an ankle pitch joint part of the first leg, the first leg supporting the robot when the robot walks;
    a second leg comprising a hip pitch joint part, the second leg swinging; and
    a control unit to calculate an angular velocity of the ankle pitch joint part of the first leg from the measured angle of the ankle of the first leg, to calculate an angular velocity of the hip pitch joint part of the second leg from the calculated angular velocity of the ankle pitch joint part of the first leg, and to generate desired trajectories of the ankle and the hip based on the angular velocity of the ankle pitch joint part of the first leg and the angular velocity of the hip pitch joint part of the second leg.

9. The robot according to claim 8, further comprising an input unit to input walking instructions, such as a walking speed and a step width of the robot, wherein the control unit rotates the first leg on a support point based on the angle of the ankle pitch joint part of the first leg measured by the measuring unit in real time according to the walking instructions of the robot.

10. The robot according to claim 9, further comprising a hip pitch joint part, wherein the control unit rotates the second leg on the hip pitch joint part based on the angular velocity of the hip pitch joint part of the second leg calculated from the calculated angular velocity of the ankle pitch joint part of the first leg.

11. The robot according to claim 10, wherein the control unit sets the rotating speed of the hip of the second leg to a designated multiple of the rotating speed of the ankle of the first leg to maintain the center of gravity of the robot.

12. The robot according to claim 8, further comprising a knee, wherein the control unit generates a desired trajectory of the knee of the second leg based on the desired trajectory of the ankle.

13. The method according to claim 2, wherein the angular velocity of hip pitch joint part of second leg K=2 so that the angular velocity of the hip pitch joint part of the second leg is twice the angular velocity of the ankle pitch joint part of the first leg.

14. The robot according to claim 8, wherein the control unit to obtain an included angle between the first and second legs to maintain a center of gravity of the robot and the ankle to rotate the ankle pitch joint part of the first leg by the included angle to generate the desired trajectory.

* * * * *